(12) United States Patent
Kurita

(10) Patent No.: US 10,138,977 B2
(45) Date of Patent: Nov. 27, 2018

(54) SHOCK ABSORBER

(71) Applicant: KYB Corporation, Tokyo (JP)

(72) Inventor: Norihiko Kurita, Gifu (JP)

(73) Assignee: KYB Corporation, Tokyo (JP)

( * ) Notice: Subject to any disclaimer, the term of this patent is extended or adjusted under 35 U.S.C. 154(b) by 139 days.

(21) Appl. No.: 15/125,994

(22) PCT Filed: Oct. 5, 2015

(86) PCT No.: PCT/JP2015/078241
§ 371 (c)(1),
(2) Date: Sep. 14, 2016

(87) PCT Pub. No.: WO2016/056518
PCT Pub. Date: Apr. 14, 2016

(65) Prior Publication Data
US 2017/0356522 A1 Dec. 14, 2017

(30) Foreign Application Priority Data

Oct. 6, 2014 (JP) .................................. 2014-205456

(51) Int. Cl.
*F16F 9/512* (2006.01)
*F16F 9/34* (2006.01)
(Continued)

(52) U.S. Cl.
CPC ................ *F16F 9/512* (2013.01); *F16F 9/34* (2013.01); *F16F 9/46* (2013.01); *F16F 9/465* (2013.01); *G05B 11/00* (2013.01)

(58) Field of Classification Search
CPC ...... F16F 9/512; F16F 9/34; F16F 9/50; F16F 9/46
See application file for complete search history.

(56) References Cited

U.S. PATENT DOCUMENTS

| 4,749,070 A | * | 6/1988 | Moser | ....................... F16F 9/46 |
|  |  |  |  | 188/266.2 |
| 4,846,317 A | * | 7/1989 | Hudgens | ............ B60G 17/0152 |
|  |  |  |  | 188/266.5 |

(Continued)

FOREIGN PATENT DOCUMENTS

| JP | 2009-250396 A | 10/2009 |
| WO | WO 2014-051045 A1 | 4/2014 |
| WO | WO 2014-125974 A1 | 8/2014 |

OTHER PUBLICATIONS

Michael S. Triantafyllou, Franz S. Hover, "Maneuvering and Control of Marine Vehicles". Nov. 5, 2003. Department of Ocean Engineering, Massachusetts Institute of Technology, Cambridge, Massachusetts USA, pp. 76-80.

(Continued)

*Primary Examiner* — Thomas J Williams
*Assistant Examiner* — James K Hsiao
(74) *Attorney, Agent, or Firm* — Rabin & Berdo, P.C.

(57) ABSTRACT

A controller of a shock absorber has a differential path configured to perform derivative compensation on the basis of a difference between a target pressure and a detected pressure or on the basis of the detected pressure, multiply the compensated value by a negative gain, and output a resulting value of the multiplication, and obtains an electric current instruction applied to a pressure control solenoid valve.

8 Claims, 5 Drawing Sheets

(51) Int. Cl.
F16F 9/46 (2006.01)
G05B 11/00 (2006.01)

(56) References Cited

U.S. PATENT DOCUMENTS

| | | | | |
|---|---|---|---|---|
| 5,396,973 | A * | 3/1995 | Schwemmer | F16F 9/38 |
| | | | | 188/266.2 |
| 6,467,592 | B1 * | 10/2002 | Dernebo | F15B 15/1466 |
| | | | | 188/278 |
| 6,905,113 | B2 * | 6/2005 | Bank | F16F 9/0445 |
| | | | | 267/122 |
| 9,038,791 | B2 * | 5/2015 | Marking | B60G 13/08 |
| | | | | 188/314 |
| 9,428,030 | B2 * | 8/2016 | Teraoka | F16F 9/5126 |
| 2003/0075403 | A1 * | 4/2003 | Dernebo | F15B 15/1466 |
| | | | | 188/284 |
| 2008/0004770 | A1 | 1/2008 | Masamura | |
| 2008/0116622 | A1 * | 5/2008 | Fox | B62K 25/08 |
| | | | | 267/64.28 |
| 2012/0279815 | A1 * | 11/2012 | Iwase | B60G 17/08 |
| | | | | 188/266.2 |
| 2015/0239317 | A1 * | 8/2015 | Kurita | B62K 25/04 |
| | | | | 701/38 |
| 2016/0025176 | A1 * | 1/2016 | Kamakura | F16F 9/34 |
| | | | | 137/487.5 |

OTHER PUBLICATIONS

Katsuhiko Ogata, "Modern Control Engineering". Fifth Edition, 2010, Library of Congress Cataloging-in-Publication Data on File, pp. 590-592.

* cited by examiner

SHOCK ABSORBER

TECHNICAL FIELD

This invention relates to a shock absorber.

BACKGROUND ART

There is known a vehicle shock absorber capable of exerting a variable damping force. The shock absorber includes, for example, a cylinder, a rod-side chamber and a piston-side chamber partitioned by a piston inside the cylinder, a reservoir, a main passage and a relief passage that causes the rod-side chamber to communicate with the reservoir, an expansion-side passage that causes the reservoir to communicate with the piston-side chamber, a contraction-side passage that causes the piston-side chamber to communicate with the rod-side chamber, a back-pressure chamber provided in the middle of the relief passage, a pressure control solenoid valve provided in the middle of the relief passage to control a pressure of the back-pressure chamber, a relief orifice provided in the middle of the relief passage in a downstream side of the pressure control solenoid valve, and a damping force control valve provided in the middle of the main passage, biased to a valve closing direction by virtue of the pressure of the back-pressure chamber as a pilot pressure, and biased to a valve opening direction by virtue of an upstream-side pressure (see JP 2009-250396 A).

The shock absorber is also provided with check valves in the expansion-side passage and the contraction-side passage in order to circulate hydraulic oil in the order of the reservoir, the piston-side chamber, the rod-side chamber, and the reservoir in a one-way manner.

Therefore, as the shock absorber makes an expanding or contracting motion, the hydraulic oil is extracted from the rod-side chamber and is discharged to the reservoir through the damping force control valve provided in the main passage.

If the pilot pressure for biasing the damping force control valve to a valve closing direction is controlled by using the pressure control solenoid valve, the valve opening pressure of the damping force control valve is controlled. As a result, the damping force generated by the shock absorber is controlled.

In the shock absorber described above, the relief orifice is provided in the downstream side of the pressure control solenoid valve so as to suppress a flow rate change of the hydraulic oil passing through the relief passage. Therefore, it is possible to suppress the pressure control solenoid valve from generating a vibration by repeating opening and closing operations when the pressure of the upstream side of the pressure control solenoid valve oscillates in the vicinity of the valve opening pressure. As a result, the damping force exerted by the shock absorber is stabilized without oscillation.

SUMMARY OF INVENTION

However, since the relief orifice is employed in the shock absorber described above, it is necessary to perform tuning for each product in order to suppress a vibration of the pressure control solenoid valve. For this reason, a vibration may not be sufficiently damped depending on a vibration period of the pressure control solenoid valve. In addition, a damping force generated by the shock absorber may not be stabilized.

The present invention has an object to provide a shock absorber capable of exerting a stable damping force while the damping force can be controlled.

According to one aspect of the present invention, a shock absorber includes a shock absorber body having a cylinder, a reservoir, a damping passage configured to discharge a liquid from the cylinder to the reservoir, and a pressure control solenoid valve provided in the damping passage; a pressure sensor configured to detect a pressure of an upstream of the pressure control solenoid valve; and a controller configured to control the pressure control solenoid valve by feeding back a detected pressure detected by the pressure sensor. The controller comprises a differential path configured to perform derivative compensation on the basis of a difference between a target pressure and the detected pressure or on the basis of the detected pressure, multiply the compensated value by a negative gain, and output a resulting value of the multiplication, and obtains an electric current instruction applied to the pressure control solenoid valve.

According to another aspect of the present invention, a shock absorber includes a shock absorber body having a cylinder, a reservoir, a damping passage configured to discharge a liquid from the cylinder to the reservoir, a pilot passage provided between the cylinder and the reservoir in parallel with the damping passage, a pressure control solenoid valve provided in the middle of the pilot passage, a pilot pressure chamber provided in the middle of the pilot passage in the upstream from the pressure control solenoid valve, and a damping valve provided in the middle of the damping passage, configured to be biased to a valve closing direction by virtue of the pressure of the pilot pressure chamber, and configured to be biased to a valve opening direction by virtue of the pressure of the upstream side of the damping passage; a pressure sensor configured to detect a pressure in the upstream of the pressure control solenoid valve; and a controller configured to control the pressure control solenoid valve by feeding back a detected pressure detected by the pressure sensor. The controller comprises a differential path configured to perform derivative compensation on the basis of a difference between a target pressure and the detected pressure or on the basis of the detected pressure, multiply the compensated value by a negative gain, and output a resulting value of the multiplication, and obtains an electric current instruction applied to the pressure control solenoid valve.

DESCRIPTION OF EMBODIMENTS

First Embodiment

A description will now be made for a shock absorber A1 according to a first embodiment of this invention with reference to the accompanying drawings.

Figure 1:
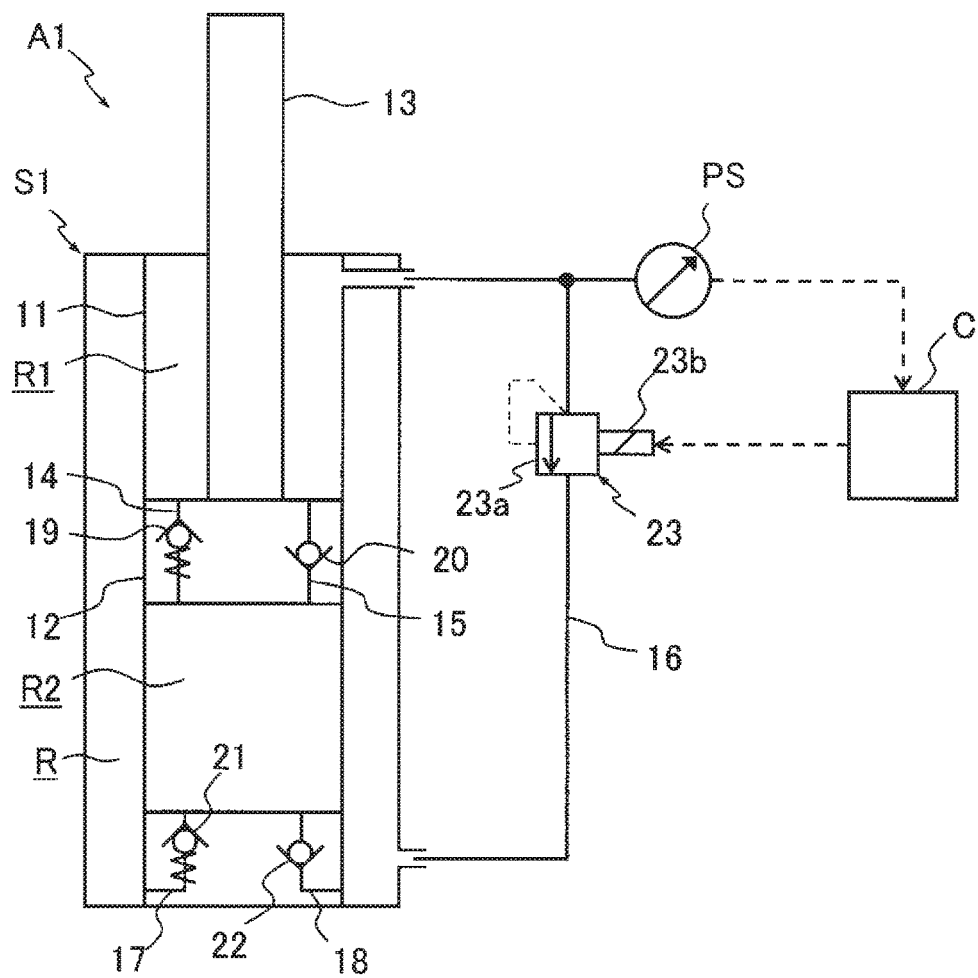
FIG. 1 is a schematic diagram illustrating a shock absorber according to a first embodiment of this invention.

Referring to FIG. 1, the shock absorber A1 includes a shock absorber body S1 interposed between a sprung member (not shown) and an unsprung member (not shown) of a vehicle, a pressure sensor PS, and a controller C.

Hereinafter, each part will be described. As illustrated in FIG. 1, the shock absorber body S1 includes, for example, a cylinder 11, a piston 12 slidably inserted into the cylinder 11, a piston rod 13 movably inserted into the cylinder 11 and connected to the piston 12, an expansion-side chamber R1 and a contraction-side chamber R2 partitioned by the piston 12 inside the cylinder 11 and filled with a fluid, a reservoir R, passages 14 and 15 that cause the expansion-side chamber R1 and the contraction-side chamber R2 to communicate with each other, a damping passage 16 that causes the expansion-side chamber R1 and the reservoir R to communicate with each other, passages 17 and 18 that cause the contraction-side chamber R2 and the reservoir R to communicate with each other, an expansion-side damping valve 19 provided in the passage 14 to generate resistance to a flow of the fluid directed from the expansion-side chamber R1 to the contraction-side chamber R2, a contraction-side check valve 20 provided in the passage 15 to permit only a flow of the fluid directed from the contraction-side chamber R2 to the expansion-side chamber R1, a contraction-side damping valve 21 provided in the middle of the passage 17 to generate resistance to a flow of the fluid directed from the contraction-side chamber R2 to the reservoir R, an expansion-side check valve 22 provided in the passage 18 to permit only a flow of the fluid directed from the reservoir R to the contraction-side chamber R2, and a pressure control solenoid valve 23 provided in the damping passage 16. It is noted that the fluid may include hydraulic oil, water, an aqueous solution, or gas.

The pressure control solenoid valve 23 includes a valve body 23a configured to open or close the damping passage 16 and a solenoid 23b configured to change an actuating force for actuating the valve body 23a to a valve closing direction depending on a supplied electric current amount.

The valve body 23a is biased to the valve opening direction by virtue of an upstream-side pressure. If a force of the valve opening direction generated by the upstream-side pressure is stronger than the actuating force generated by the solenoid 23b to actuate the valve body 23a to the valve closing direction, the valve body 23a is opened, so that the damping passage 16 is opened.

Therefore, the valve opening pressure of the pressure control solenoid valve 23 is determined by the electric current amount supplied to the solenoid 23b. According to this embodiment, as the electric current amount increases, the valve opening pressure increases accordingly.

The pressure control solenoid valve 23 is provided in the damping passage 16 that causes the expansion-side chamber R1 to communicate with the reservoir R in order to control the upstream pressure to the valve opening pressure. Therefore, the pressure of the expansion-side chamber R1 can be controlled to the valve opening pressure.

In an expanding process of the shock absorber body S1, the pressure of the expansion-side chamber R1 pressurized by the piston 12 increases, so that the fluid moves from the expansion-side chamber R1 to the contraction-side chamber R2 through the expansion-side damping valve 19. In addition, the fluid is discharged to the reservoir R through the damping passage 16.

The fluid flows from the expansion-side chamber R1 into the contraction-side chamber R2 having a volume expanding by the movement of the piston 12. In addition, the expansion-side check valve 22 is opened, so that the fluid is supplied from the reservoir R as much as the shortage.

Therefore, the pressure of the contraction-side chamber R2 becomes equal to the pressure of the reservoir, and the shock absorber body S1 exerts an expansion-side damping force depending on the pressure difference between the expansion-side chamber R1 and the contraction-side chamber R2 so that expansion of itself is suppressed.

In addition, the pressure of the expansion-side chamber R1 can be controlled by controlling the valve opening pressure of the pressure control solenoid valve 23 provided in the middle of the damping passage 16. Therefore, it is possible to control the expansion-side damping force of the shock absorber body S1.

In a contracting process of the shock absorber body S1, the pressure of the contraction-side chamber R2 compressed by the piston 12 increases, so that the fluid moves from the contraction-side chamber R2 to the reservoir R through the contraction-side damping valve 21. In addition, the fluid also moves to the expansion-side chamber R1 through the contraction-side check valve 20. Furthermore, the piston rod 13 intrudes into the cylinder 11, and the fluid is discharged from the expansion-side chamber R1 to the reservoir R through the damping passage 16.

Due to the movement of the piston 12, the volume of the contraction-side chamber R2 is reduced, and the pressure increases. Here, since the fluid flows from the contraction-side chamber R2 via the expansion-side chamber R1 and is discharged to the reservoir R through the pressure control solenoid valve 23, the pressure of the expansion-side chamber R1 and the pressure of the contraction-side chamber R2 can be controlled by controlling the valve opening pressure of the pressure control solenoid valve 23. Therefore, the contraction-side damping force of the shock absorber body S1 can be controlled by controlling the valve opening pressure of the pressure control solenoid valve 23.

It is noted that the circuit configuration of the shock absorber body S1 described above is just for illustrative purpose, and it is not intended to limit the scope of the invention.

According to this embodiment, both the expansion-side damping force and the contraction-side damping force are controlled by controlling the pressure of the expansion-side chamber R1 by using the pressure control solenoid valve 23. Instead, any other circuit configuration may also be employed.

For example, only the pressure of the contraction-side chamber R2 may be controlled by using the pressure control solenoid valve 23. Alternatively, a pressure control solenoid valve for controlling the pressure of the expansion-side chamber R1 and a pressure control solenoid valve for controlling the pressure of the contraction-side chamber R2 may be provided separately.

Alternatively, a uni-flow structure may be employed, in which a full flow of the fluid is discharged from the cylinder 11 to the reservoir R as the shock absorber body S1 makes an expanding or contracting motion. In addition, the pressure control solenoid valve 23 may be provided in the middle of the damping passage 16 where a full flow of the fluid discharged from the cylinder 11 passes.

In this case, the pressure sensor PS is installed to detect a pressure of the upstream of the pressure control solenoid valve 23 in the middle of the damping passage 16, so that the detected pressure is input to the controller C. It is noted that where the pressure sensor PS is installed is not limited thereto. Alternatively, the pressure sensor PS may be installed in the cylinder 11 to directly detect the pressure of the expansion-side chamber R1.

Figure 2:
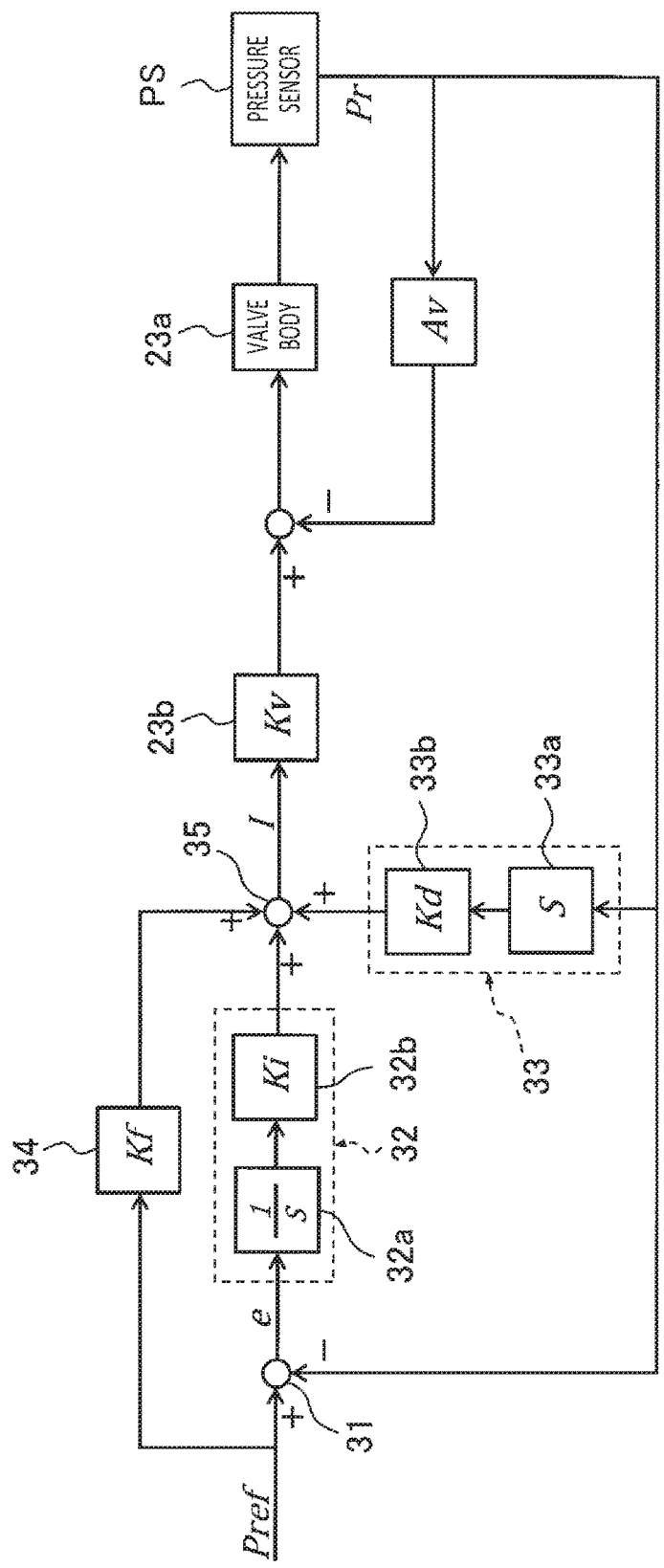
FIG. 2 is a block diagram illustrating a controller and a pressure control solenoid valve of the shock absorber according to the first embodiment of this invention.

As illustrated in FIG. 2, the controller C includes a difference calculator 31 that receives a target pressure Pref of the valve opening pressure of the pressure control solenoid valve 23 and a detected pressure Pr output from the pressure sensor PS and calculates a difference e between the target pressure Pref and the detected pressure Pr, an integral path 32 that performs integral compensation based on the difference e, a differential path 33 that performs derivative compensation based on the detected pressure Pr, multiplies the compensated value by a negative gain Kd, and outputs a resulting value, a feed forward path 34, and an adder 35 that adds the values output from each path. The target pressure Pref is input from a host controller (not shown) that performs a vehicle posture control. It is noted that FIG. 2 is a block diagram illustrating the solenoid 23b and the valve body 23a.

The difference calculator 31 obtains the difference e by subtracting the detected pressure Pr from the target pressure Pref.

The integral path 32 has an integrator 32a that integrates the difference e and a gain multiplier 32b that multiplies the value output from the integrator 32a by an integration gain Ki. The integral path 32 outputs a resulting value of the gain multiplier 32b as an operational amount generated by the integral compensation.

It is noted that, as the difference e is obtained, the integrator 32a adds the newly obtained difference e to a total sum of the previously obtained differences e and outputs a resulting sum. The integrator 32a may be a low-pass filter, or the integral value of the difference e may be obtained through a filtering process.

The differential path 33 includes a differentiator 33a that differentiates the detected pressure Pr and a gain multiplier 33b that multiplies the value output from the differentiator 33a by a negative derivative gain Kd. The differential path 33 outputs a resulting value of the gain multiplier 33b as an operational amount generated by the derivative compensation.

It is noted that, as the detected pressure Pr is input, the differentiator 33a obtains a difference between the currently input detected pressure Pr and the previously input detected pressure Pr and outputs the resulting difference. The differentiator 33a may be a high-pass filter, or the derivative value of the detected pressure Pr may be obtained through a filtering process.

The feed forward path 34 multiplies the target pressure Pref by a feed forward gain Kf and outputs a resulting value. Due to the feed forward path 34 provided in the controller C, it is possible to perform control with excellent followability to the target pressure Pref advantageously. Alternatively, the feed forward path 34 may also be omitted.

The adder 35 adds the value output from the integral path 32, the value output from the differential path 33, and the value output from the feed forward path 34 to generate an electric current instruction I for instructing an electric current amount applied to the solenoid 23b of the pressure control solenoid valve 23.

In the differential path 33, the gain multiplier 33b multiplies the value output from the differentiator 33a by a negative gain Kd, and a resulting value is added by the adder 35 and output. However, the operation of setting the negative sign of the gain Kd is equivalent to the operation of setting a positive gain Kd and adding it by inverting the sign in the adder 35. Therefore, such a design modification is also included in the operation of multiplying the negative gain Kd and outputting a resulting value.

The electric current instruction I generated by the adder 35 is input to a driver (not shown) for driving the solenoid 23b. The driver supplies the solenoid 23b with the electric current instructed by the electric current instruction I.

As illustrated in FIG. 2, the solenoid 23b exerts an actuating force corresponding to a value obtained by multiplying the electric current i supplied based on the electric current instruction I by a proportional solenoid characteristic Kv.

The valve body 23a is positioned in a location where a force obtained by multiplying the pressure Pr of the upstream of the pressure control solenoid valve 23 (equal to the detected pressure Pr) by the pressurized area Av of the valve body 23a is balanced with the actuating force exerted by the solenoid 23b and opens or closes the damping passage.

As a result, the pressure control solenoid valve 23 controls the pressure of the expansion-side chamber R1 in the upstream side. The pressure of the expansion-side chamber R1 controlled by the pressure control solenoid valve 23 is detected by the pressure sensor PS and is input to the feedback loop as the detected pressure Pr. It is noted that the target pressure Pref may be generated by the controller C.

As described above, the controller C obtains the electric current instruction I based on the detected pressure Pr and the target pressure Pref and outputs the electric current instruction I to the driver that drives the solenoid 23b.

The controller C includes, for example, an analog/digital (A/D) converter for obtaining the signal output from the pressure sensor PS, a memory unit such as a read-only memory (ROM) for storing a program used in the necessary control processing, a computer such as a central processing unit (CPU) for executing processes based on the program, and a memory unit such as a random access memory (RAM) for providing the CPU with a storage area. In addition, as the CPU executes the program, various control operations are implemented by the controller C.

The shock absorber A1 according to the first embodiment is configured as described above. In the process of obtaining the electric current instruction I in the controller C, the differential path 33 differentiates the detected pressure Pr detected by the pressure sensor PS, multiplies the derivative value by the negative gain Kd, and outputs a resulting value.

Here, as the pressure control solenoid valve 23 is opened, the pressure decreases concurrently by virtue of compressibility of the fluid. Due to this pressure decrease, the pressure control solenoid valve 23 is closed, and the pressure increases. Due to this pressure increase, the pressure control solenoid valve 23 is opened again. As a result, this sequence is repeated. For this reason, when the pressure control solenoid valve 23 is opened, the pressure oscillates.

For this reason, while the difference e between the target pressure Pref and the detected pressure Pr oscillates, the differential path 33 outputs the operational amount so as to cancel an abrupt pressure change. That is, the differential path 33 outputs the operational amount so as to cancel a vibration of the pressure control solenoid valve 23. Therefore, even when the pressure of the upstream of the pressure control solenoid valve 23 changes abruptly, the electric current instruction I changes smoothly. As a result, it is possible to suppress a vibration caused by repeated opening and closing operations of the pressure control solenoid valve 23.

Since no relief orifice is employed in the shock absorber A1 according to this embodiment, there is no need to perform tuning of the orifice for each product in order to suppress a vibration of the pressure control solenoid valve 23. In addition, it is possible to sufficiently reduce a vibration of the pressure control solenoid valve 23 regardless of a vibration period and stabilize the damping force generated by the shock absorber A1. Therefore, according to this embodiment, it is possible to exert a stable damping force while the damping force can be controlled.

It is noted that the electric current instruction I changes slowly even when the pressure of the upstream side of the pressure control solenoid valve 23 changes abruptly other than the vicinity of the valve opening pressure. Therefore, the opening level of the pressure control solenoid valve 23 also changes slowly. Accordingly, an abrupt change of the damping force generated by the shock absorber A1 is alleviated, and a vehicle ride quality is improved. Furthermore, since the opening level of the pressure control solenoid valve 23 changes smoothly, the pressure change in the upstream of the pressure control solenoid valve 23 is also suppressed. Therefore, the damping force generated by the shock absorber A1 is stabilized.

According to this embodiment, there is no need to provide a relief orifice in the downstream of the pressure control solenoid valve 23. Therefore, when the pressure control solenoid valve 23 fully opens the damping passage 16, a pressure override caused by a flow rate/pressure characteristic of the relief orifice is not superimposed on the pressure of the expansion-side chamber R1. Therefore, it is possible to widen a controllable range of the damping force of the shock absorber A1.

It is noted that, since the pressure control solenoid valve 23 is opened as the valve body 23a receives the pressure of the upstream side, the electric current i supplied to the solenoid 23b is proportional to the pressure Pr applied to the valve body 23a (equal to the detected pressure Pr).

Therefore, the use of the pressure control solenoid valve 23 is equivalent to the control operation of feeding back the pressure and performing proportional compensation. In addition, integration differentiation control of the pressure control solenoid valve 23 is equivalent to proportional integration differentiation control.

If a throttle valve such as a spool valve for changing the opening level regardless of the pressure of the upstream side is employed, it is necessary to provide a proportional path for performing the proportional compensation. However, the shock absorber A1 is not necessarily provided with the proportional path. Therefore, the pressure control solenoid valve 23 can provide a fast response to the pressure Pr.

Figure 3:
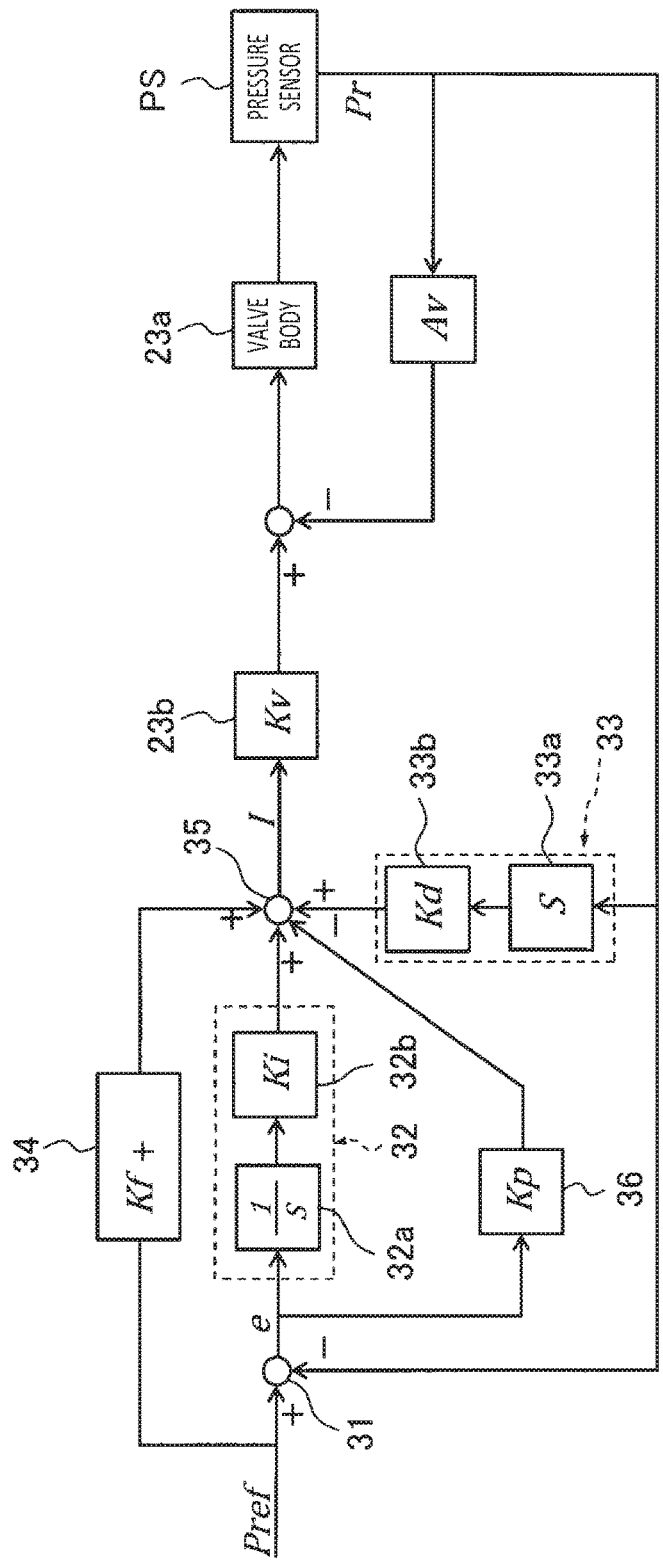
FIG. 3 is a block diagram illustrating a controller and a pressure control solenoid valve according to a modification of this invention.

As illustrated in FIG. 3 which shows a modification of the invention, a proportional path 36 having a gain multiplier that multiplies the difference e by a proportional gain Kp may also be provided. In this case, the output value of the proportional path 36 is subtracted from a value obtained by adding the output value of the integral path 32, the output value of the differential path 33, and the output value of the feed forward path 34 by using the adder 35.

If the proportional gain Kp is set to "Kp=Av/Kv" considering a relationship "Pr·Av=Δi·Kv" (where "Δi" denotes the operational amount of the proportional path 36), it is possible to perfectly cancel an influence of the hydrodynamic force applied to the valve body 23a.

In this case, it is necessary to set the feed forward gain of the feed forward path 34 to "Kf+Kp" because the amount corresponding to the proportional gain Kp is subtracted from the operational amount of the feed forward path 34.

Similarly, in this case, even when the pressure of the upstream of the pressure control solenoid valve 23 changes abruptly, it is possible to cancel the pressure applied to the valve body 23a by using the electric current instruction I. Therefore, it is possible to suppress a vibration caused by repeated opening and closing operations of the pressure control solenoid valve 23. In addition, it is possible to easily set the proportional gain Kp based on a structure of the pressure control solenoid valve 23.

According to this embodiment, the integral path 32 is provided to perform integral compensation based on the difference e. Therefore, it is possible to remove a steady-state deviation between the target pressure Pref and the detected pressure Pr. As a result, it is possible to perform control with excellent followability to the target pressure Pref and control the damping force of the shock absorber A1 with excellent accuracy.

It is noted that the same effect of the invention can be obtained by omitting the integral path 32 and providing only the differential path 33. Alternatively, the integral path 32 may be omitted while the proportional path 36 and the differential path 33 are employed.

In the shock absorber A1 according to this embodiment, the differential path 33 performs the derivative compensation of the detected pressure Pr. For this reason, since the derivative compensation is not performed for an abrupt change of the target pressure Pref, responsiveness to a reference value is excellent, and the operational stability of the pressure control solenoid valve 23 is high.

Figure 4:
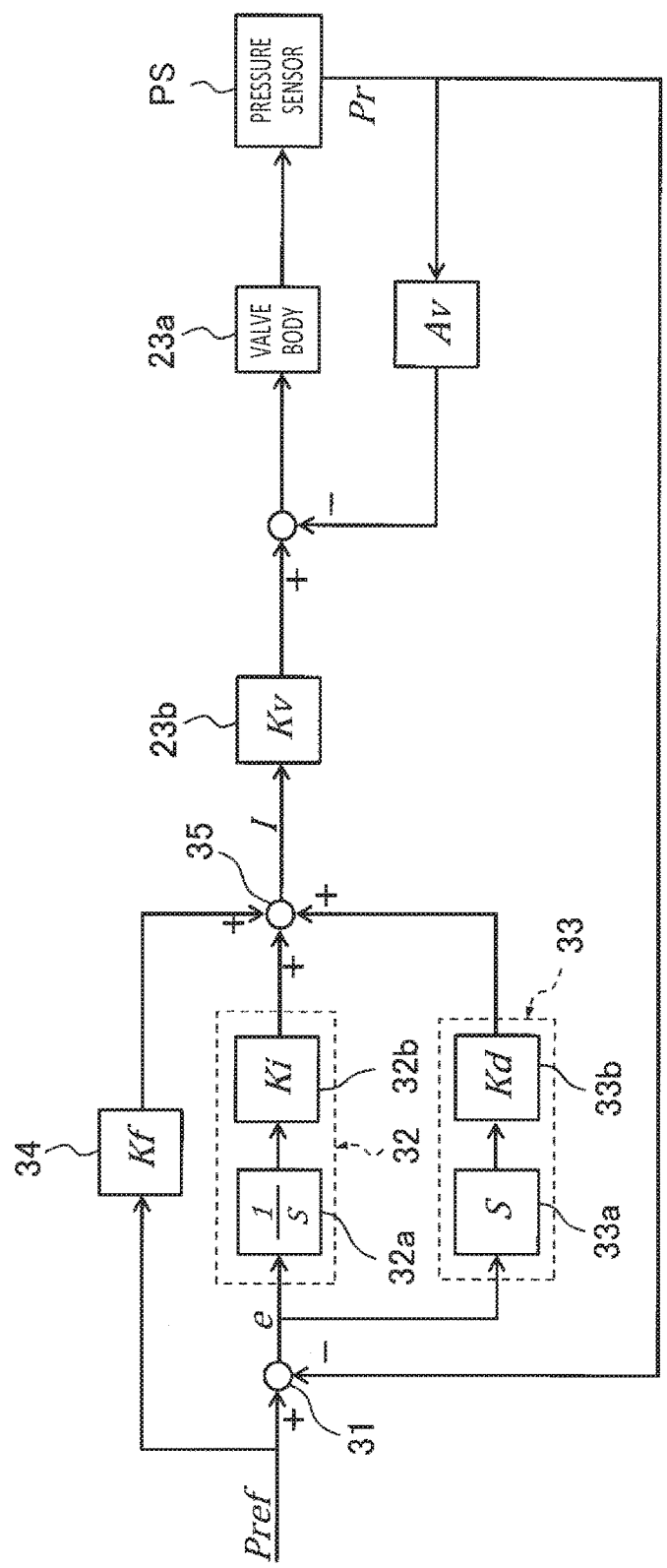
FIG. 4 is a block diagram illustrating a controller and a pressure control solenoid valve according to another modification of this invention.

Alternatively, as illustrated in FIG. 4 which shows another modification, the differential path 33 may perform derivative compensation for the difference e between the target pressure Pref and the detected pressure Pr instead of the derivative compensation for the detected pressure Pr.

Similarly, in this case, even when the pressure of the upstream of the pressure control solenoid valve 23 abruptly changes, the electric current instruction I changes slowly. Therefore, it is possible to suppress a vibration caused by repeated opening and closing operations of the pressure control solenoid valve 23.

Second Embodiment

Next, a description will be made for a shock absorber A2 according to a second embodiment. It is noted that like reference numerals denote like elements as in the shock absorber A1, and they will not be repeatedly described.

Figure 5:
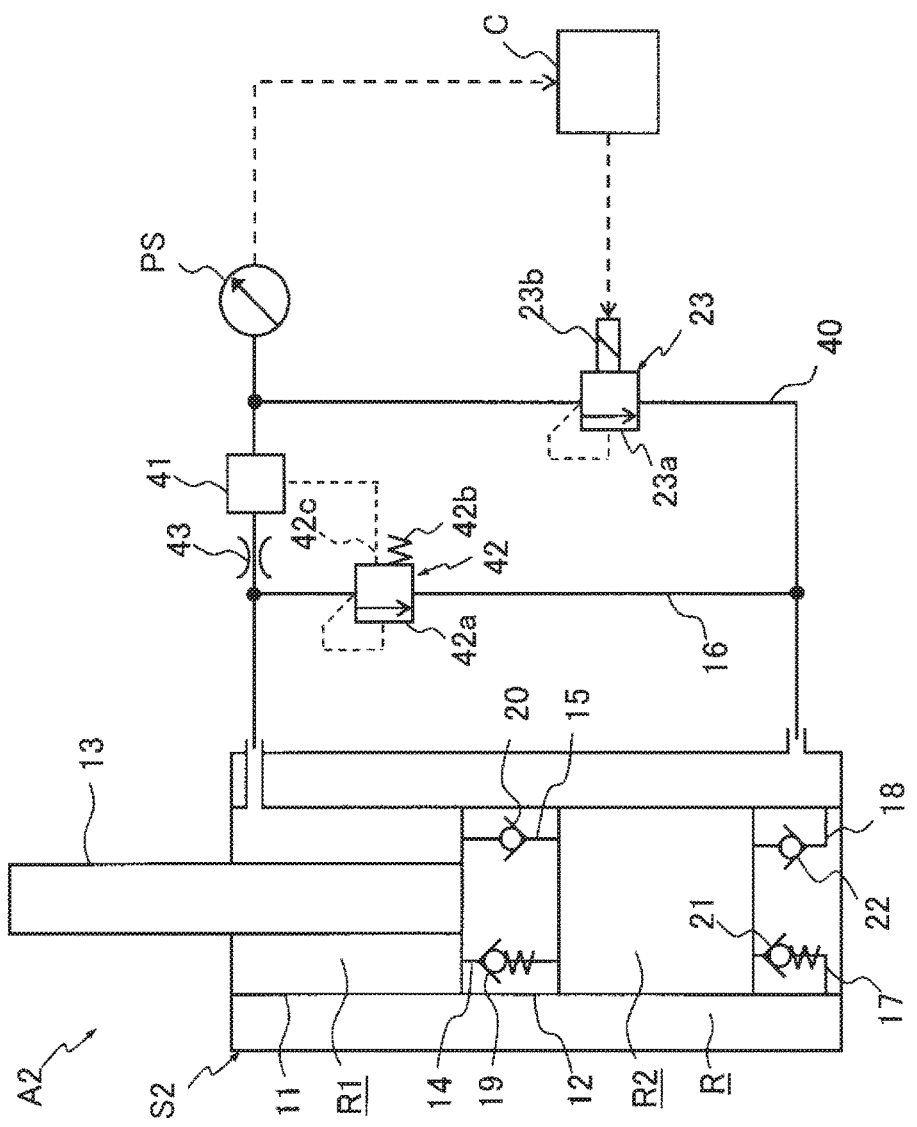
FIG. 5 is a schematic diagram illustrating a shock absorber according to a second embodiment of this invention.

As illustrated in FIG. 5, the shock absorber A2 includes a shock absorber body S2 interposed between a sprung member (not shown) and an unsprung member (not shown) of a vehicle, a pressure sensor PS, and a controller C.

The shock absorber body S2 of the shock absorber A2 according to the second embodiment has a configuration different from that of the shock absorber A1 of the first embodiment, and other parts are similar.

Hereinafter, the shock absorber body S2 having a configuration different from that of the shock absorber A1 will be described in more detail.

As illustrated in FIG. 5, the shock absorber body S2 includes a cylinder 11, a piston 12 slidably inserted into the cylinder 11, a piston rod 13 movably inserted into the cylinder 11 and connected to the piston 12, an expansion-side chamber R1 and a contraction-side chamber R2 partitioned by the piston 12 inside the cylinder 11 and filled with a fluid, a reservoir R, passages 14 and 15 that cause the expansion-side chamber R1 and the contraction-side chamber R2 to communicate with each other, a damping passage 16 that causes the expansion-side chamber R1 and the reservoir R to communicate with each other, a pilot passage 40 provided in parallel with the damping passage 16 to cause the expansion-side chamber R1 and the reservoir R to communicate with each other, passages 17 and 18 that cause the contraction-side chamber R2 and the reservoir R to communicate with each other, an expansion-side damping valve 19 provided in the passage 14 to generate resistance to a flow of the fluid directed from the expansion-side chamber R1 to the contraction-side chamber R2, a contraction-side check valve 20 provided in the passage 15 to permit only a flow of the fluid directed from the contraction-side chamber R2 to the expansion-side chamber R1, a contraction-side damping valve 21 provided in the middle of the passage 17 to generate resistance to a flow of the fluid directed from the contraction-side chamber R2 to the reservoir R, an expansion-side check valve 22 provided in the passage 18 to permit only a flow of the fluid directed from the reservoir R to the contraction-side chamber R2, a pressure control solenoid valve 23 provided in the pilot passage 40, a pilot pressure chamber 41 provided in the middle of the pilot passage 40 in the upstream from the pressure control solenoid valve 23, and a damping valve 42 provided in the middle of the damping passage 16, biased to a valve closing direction by virtue of the pressure of the pilot pressure chamber 41, and biased to a valve opening direction by virtue of the pressure of the upstream side of the damping passage 16. It is noted that the fluid may include hydraulic oil, water, an aqueous solution, or gas.

The pilot pressure chamber 41 is provided in the upstream of the pressure control solenoid valve 23 in the middle of the pilot passage 40. In addition, an orifice 43 is provided in the upstream of the pilot pressure chamber 41 in the middle of the pilot passage 40.

Therefore, the pressure of the pilot pressure chamber 41 arranged in the upstream side of the pressure control solenoid valve 23 can be controlled by controlling the valve opening pressure of the pressure control solenoid valve 23. In addition, due to the orifice 43, the pressure of the pilot pressure chamber 41 becomes lower than the pressure of the expansion-side chamber R1 as much as a pressure loss of the orifice 43.

The damping valve 42 as a pressure control valve includes a valve body 42a for opening or closing the damping passage 16, a spring 42b that biases the valve body 42a toward a valve closing direction, and a pilot pressure introducing passage 42c that applies the pressure of the pilot pressure chamber 41 to the valve body 42a toward the valve closing direction.

Therefore, the valve body 42a of the damping valve 42 receives the upstream pressure of the expansion-side chamber R1 applied to the valve opening direction, the pressure of the pilot pressure chamber 41, which is lower than the pressure of the expansion-side chamber R1, applied to the valve closing direction, and the biasing force of the spring 42b applied to the valve closing direction. In addition, if a force of actuating the valve body 42a to the valve opening direction is stronger than a force of actuating the valve body 42a to the valve closing direction, the damping valve 42 is opened, and the damping passage 16 is opened. Meanwhile, since the pressure of the pilot pressure chamber 41 is controlled by the pressure control solenoid valve 23, the valve opening pressure of the damping valve 42 is also controlled in this manner.

The pressure sensor PS detects the pressure of the upstream side of the pressure control solenoid valve 23, and the detected pressure Pr is input to the controller C. The pressure sensor PS detects the pressure of the pilot pressure chamber 41 according to this embodiment. However, the control for suppressing a vibration of the pressure control solenoid valve 23 may be performed by detecting a pressure change in the upstream. Therefore, the pressure sensor PS may be installed in any place in the upstream of the pressure control solenoid valve 23. Accordingly, the control may also be performed by detecting the pressure of the expansion-side chamber R1.

The controller C of the shock absorber A2 has a configuration similar to that of the shock absorber A1. Therefore, also in the shock absorber A2, in the process of obtaining the electric current instruction I in the controller C, the differential path 33 performs derivative compensation based on the detected pressure Pr detected by the pressure sensor PS, multiplies the compensated value by the negative gain Kd, and outputs a resulting value.

Therefore, when the pressure of the upstream of the pressure control solenoid valve 23 changes in the vicinity of the valve opening pressure, and the difference e between the target pressure Pref and the detected pressure Pr also oscillates, the differential path 33 outputs the operational amount so as to cancel an abrupt pressure change. That is, the differential path 33 outputs the operational amount so as to cancel a vibration of the pressure control solenoid valve. Therefore, even when the pressure of the upstream of the pressure control solenoid valve 23 abruptly changes, the electric current instruction I changes slowly. As a result, it is possible to suppress a vibration caused by repeated opening and closing operations of the pressure control solenoid valve 23.

Since the shock absorber A2 does not have a relief orifice in the downstream of the pressure control solenoid valve 23, there is no need to perform tuning of the relief orifice for each product for suppressing a vibration of the pressure control solenoid valve 23. In addition, it is possible to sufficiently suppress a vibration of the pressure control solenoid valve 23 regardless of a vibration period and stabilize a damping force generated by the shock absorber A2. As a result, according to this embodiment, it is possible to exert a stable damping force while the damping force can be controlled.

It is noted that, since the electric current instruction I changes slowly even when the pressure of the upstream of the pressure control solenoid valve 23 abruptly changes other than the vicinity of the valve opening pressure, the opening level of the pressure control solenoid valve 23 also changes slowly. Therefore, it is possible to alleviate an abrupt change of the damping force generated by the shock absorber A2 and improve a vehicle ride quality. In addition, since the opening level of the pressure control solenoid valve 23 changes slowly, a pressure change in the upstream of the pressure control solenoid valve 23 is also suppressed. Therefore, it is possible to stabilize the damping force generated by the shock absorber A2.

According to this embodiment, there is no need to provide a relief orifice in the downstream of the pressure control solenoid valve 23. Therefore, when the pressure control solenoid valve 23 fully opens the pilot passage 40, a pressure override caused by a flow rate pressure characteristic of the relief orifice is not overlapped with the pressure of the pilot pressure chamber 41. Therefore, it is possible to widen a controllable range of the damping force of the shock absorber A2.

Similar to the shock absorber A1, the shock absorber A2 may also be provided with a proportional path 36 in the controller C. In addition, the integral path 32 may also be omitted. Furthermore, the differential path 33 may perform derivative compensation for the difference e between the target pressure Pref and the detected pressure Pr instead of the derivative compensation for the detected pressure Pr.

The embodiments of the present invention described above are merely illustration of some application examples of the present invention and not of the nature to limit the technical scope of the present invention to the specific constructions of the above embodiments.

The present application claims a priority based on Japanese Patent Application No. 2014-205456 filed with the Japan Patent Office on Oct. 6, 2014, all the contents of which are hereby incorporated by reference.

The invention claimed is:

1. A shock absorber, comprising:
a shock absorber body having
a cylinder,
a reservoir,
a damping passage configured to discharge a liquid from the cylinder to the reservoir, and
a pressure control solenoid valve provided in the damping passage, the pressure control solenoid valve including a valve body and a solenoid;
a pressure sensor configured to detect a pressure upstream of the pressure control solenoid valve; and
a controller configured to control the pressure control solenoid valve by feeding back a detected pressure detected by the pressure sensor, wherein
the controller comprises a differential path configured to
perform derivative compensation on one of the detected pressure, and a difference value between a target pressure and the detected pressure by multiplying one of the detected pressure and the difference value by a negative gain, and
obtain a resulting value of the multiplication and applying the resulting values as an electric current instruction to be applied to the solenoid valve, and
the valve body receives
a first force that is proportional to the pressure upstream of the pressure control solenoid valve, and
a second force generated by the solenoid through which a current, based on the electric current instruction, passes, thereby controlling a flow rate of the liquid discharged in the damping passage.

2. A shock absorber comprising:
a shock absorber body having
a cylinder, a reservoir,
a damping passage configured to discharge a liquid from the cylinder to the reservoir,
a pilot passage provided between the cylinder and the reservoir in parallel with the damping passage,
a pressure control solenoid valve provided in the middle of the pilot passage, the pressure control solenoid valve including a valve body and a solenoid,
a pilot pressure chamber provided in the middle of the pilot passage upstream from the pressure control solenoid valve, and
a damping valve provided in the middle of the damping passage, configured to be biased to a valve closing direction by virtue of a pressure of the pilot pressure chamber, and configured to be biased to a valve opening direction by virtue of a pressure upstream of the damping passage;
a pressure sensor configured to detect a pressure upstream of the pressure control solenoid valve; and
a controller configured to control the pressure control solenoid valve by feeding back a detected pressure detected by the pressure sensor, wherein
the controller comprises a differential path configured to
perform derivative compensation on one of the detected pressure and a difference value between a target pressure and the detected pressure by multiplying one of the detected pressure and the difference value by a negative gain, and
obtain a resulting value of the multiplication and applying the resulting values as an electric current instruction, and
the valve body receives
a first force that is proportional to the pressure upstream of the pressure control solenoid valve, and
a second force generated by the solenoid through which a current, based on the electric current instruction, passes, thereby controlling a flow rate of the liquid discharged in the damping passage.

3. The shock absorber according to claim 1, wherein the controller comprises an integral path configured to perform integral compensation on the basis of a difference between the target pressure and the detected pressure, and obtains the electric current instruction by adding a value of the integral path and a value of the differential path.

4. The shock absorber according to claim 1, wherein the pressure control solenoid valve comprises the valve body configured to be biased to a valve opening direction by virtue of the pressure upstream of the pressure control solenoid valve, and
a solenoid configured to exert an actuating force actuating the valve body to a valve closing direction.

5. The shock absorber according to claim 1, wherein the pressure sensor detects a pressure of the cylinder.

6. The shock absorber according to claim 2, wherein the controller comprises an integral path configured to perform integral compensation on the basis of a difference between the target pressure and the detected pressure, and obtains the electric current instruction by adding a value of the integral path and a value of the differential path.

7. The shock absorber according to claim 2, wherein the pressure control solenoid valve comprises the valve body configured to be biased to a valve opening direction by virtue of the pressure upstream of the pressure control solenoid valve, and
a solenoid configured to exert an actuating force actuating the valve body to a valve closing direction.

8. The shock absorber according to claim 2, wherein the pressure sensor detects a pressure of the cylinder.

* * * * *